Nov. 21, 1961    J. H. ANDRESEN, JR    3,009,357
AIRCRAFT INSTRUMENT-REMOTE CONTROL-FAIL SAFE
Filed Oct. 8, 1956    4 Sheets-Sheet 1

INVENTOR
JOHN H. ANDRESEN, JR.

BY
OSTROLENK, FABER, GERB & SOFFEN
ATTORNEYS

Nov. 21, 1961  J. H. ANDRESEN, JR  3,009,357
AIRCRAFT INSTRUMENT-REMOTE CONTROL-FAIL SAFE
Filed Oct. 8, 1956  4 Sheets-Sheet 3

INVENTOR.
JOHN H. ANDRESEN, JR.
BY Ostrolenk, Faber,
Gerb & Soffen
ATTORNEYS

Nov. 21, 1961 J. H. ANDRESEN, JR 3,009,357
AIRCRAFT INSTRUMENT-REMOTE CONTROL-FAIL SAFE
Filed Oct. 8, 1956 4 Sheets-Sheet 4

INVENTOR.
JOHN H. ANDRESEN, JR.
BY
ATTORNEY.

****3,009,357
AIRCRAFT INSTRUMENT—REMOTE
CONTROL—FAIL SAFE
John H. Andresen, Jr., Greenwood Lake, N.Y., assignor
to Kollsman Instrument Corporation, Elmhurst, N.Y.,
a corporation of New York
Filed Oct. 8, 1956, Ser. No. 614,670
3 Claims. (Cl. 73—384)

This invention relates to an instrument system in which the position of a pointer is independently controlled by mechanical and electrical measuring means wherein the electrical measuring means serves to correct the mechanical indication and the mechanical indication will continue to function by itself in the event that the electrical system becomes inoperative.

While mechanically actuated aircraft instruments such as altimeters have been refined to provide very accurate indications, they cannot as a practical matter inherently include compensation for all possible factors. Such compensation and correction may be achieved by an electrical system including, where desired, computing devices as well as information gathering and transmitting devices which may integrate information. Where the indication is transmitted to the dial electrically, any failure in the electrical system will make the device inoperative.

The principal object of this invention is the provision in a unit of a substantially standard mechanically or otherwise operated aircraft instrument, such as an aneroid altimeter, together with electrical means for operating the unit as a whole in either of two ways: (1) to correct or adjust the unit in accordance with electrically transmitted information or (2) to operate the unit as a whole in response to electrically transmitted information. In the first case, the electrically transmitted information is used to correct the mechanically achieved indication. In the second case, the electrically transmitted information operates the unit as a whole to achieve an indication. In either case, in the event of failure of the transmitting electrical network, the mechanical elements in the unit will take over to perform an indicating job. In this way, the mechanical elements have also the stand-by function of providing an indication in the event of failure of the electrical system.

In one embodiment of my invention, a mechanical actuating system within a rotatable frame is utilized to operate a pointer with respect to a stationary indicating dial, and an electrical system is provided for rotating the frame and all internal elements including the pointer with respect to the indicating dial.

Hence, a mechanical reading is obtained by the rotation of the pointer with respect to its frame while a correction of the mechanical reading is obtained by rotating the frame and its associated pointer by means of electrically actuated devices.

The frame may be then further constructed so as to be biased to a zero correction position or position from which the housing is rotated by the electrically actuated correction.

Hence, it may be seen that with my novel instrument, the pilot of an aircraft will still have the benefit of, for instance, the mechanical altitude reading, although the electrical correction system which provides a highly accurate altitude reading when operative is disabled.

Thus, a mechanical instrument may be corrected for instrument errors by an electrically operated instrument error correction system which changes the frame position in accordance with the mechanical reading of the instrument.

Similarly, static system errors which are functions of Mach number and angle of attack may be corrected.

While the electrically actuated portion of my novel system may be utilized to add or subtract from the mechanical reading, the electrical portion may alternatively be a central air data computer which completely computes the accurate reading for the instrument, and this value is servoed to the pointer by a motor which rotates the frame of the instrument, the pointer position being fed back by a Synchrotel attached to it, the frame operating merely as a link in the system during electrical operation. When the Synchrotel performs a plurality of complete rotations over the full range of the instrument, the instrument within the frame is needed further to obtain a coarse positioning of the pointer within a 180° rotation of the Synchrotel attached to the pointer, the air data computer providing the accurate value within this coarse range.

Hence, while the electrical system is operative, the pointer reading with respect to its indicating dial will be the most accurate value given by the electrical system, whereas the less accurate mechanical reading is available in the event of a failure of the electrical system as was true of the above-mentioned embodiment in which the electrical system operated as a correcting means.

It is to be realized that while I have described my invention in conjunction with a rotatable frame for housing the pointer and achieving electrical correction by rotating the frame, the pointer position may be altered in any desirable manner from its mechanical position.

Accordingly, a primary object of my invention is to provide an instrument system having the high accuracy of an electrical measuring device while still affording the reading of a mechanical device in the event of a failure in the electrical system.

Another object of my invention is to provide an indicating device wherein the pointer is rotated with respect to its supporting frame and indicating dial by a mechanical measuring means while the frame and pointer assembly are rotated with respect to the indicating dial by an electrical measuring system.

Still another object of my invention is to provide a mechanical indicating instrument whose reading may be modified in accordance with an electrically calculated error.

A further object of my invention is to provide an indicating instrument wherein a pointer is actuated by mechanical means while its supporting frame is actuated by an electrical measuring means which computes the complete value to be measured and thereafter corrects the pointer reading by means of a synchro on the pointer and a servo motor which rotates the frame.

Still a further object of my invention is to provide a mechanical measuring instrument whose value may be modified in accordance with an electrically computed value wherein spring biasing means are provided to return the instrument to its uncorrected value responsive to failure of electrical power.

In altimeters, it is desirable that an initial barometric adjustment be made with respect to the barometric condition of the area in which the instrument is located or will be located upon landing of its associated aircraft, this adjustment being made by a knob which protrudes from the instrument to the instrument panel. When an instrument is constructed so as to have a mechanical reading modified by an electrically computed value as has been set forth above, I have found that the barometric adjustment may be made by connecting the barometric adjusting means through a differential which includes the electrical connecting means for adjusting the pointer reading. Hence, the barometric adjustment and electrical modification of the pointer position may be made independently of one another in view of the mechanical differential.

Furthermore, the frame and pointer will, upon electrical correction thereof, be repositioned to indicate a reading which has already been corrected for variations from standard atmospheric conditions.

Accordingly, a further object of my invention is to provide an altimeter which provides an electrically corrected mechanical reading and is adapted to further provide initial barometric adjustment for local atmospheric conditions.

Still a further object of my invention is to connect an initial barometric adjusting means and an electrical correction means through a mechanical differential to a frame supporting a mechanically actuated pointer so as to make the initial barometric adjusting means and electrical correcting means independent of one another.

These and other objects of my invention will now become apparent from the following description when taken in connection with the drawings in which.

Figure 1:
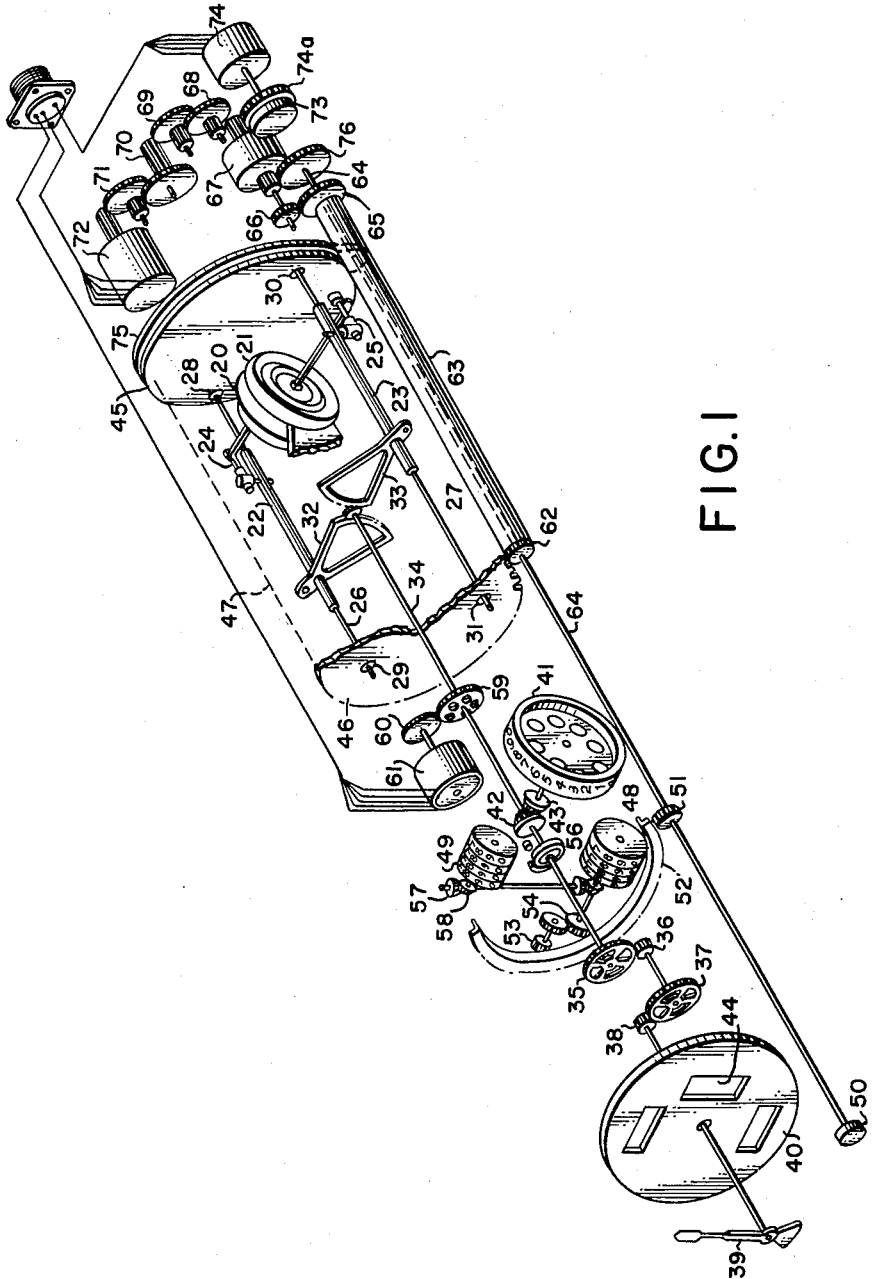
FIGURE 1 is an exploded perspective view of an indicating device constructed in accordance with my novel invention.

Referring now to FIGURE 1, it is seen that the mechanical portion of my novel system is comprised of the two aneroid elements 20 and 21 which are connected in parallel to the rocking shafts 22 and 23, respectively, through arms which engage the bimetal compensators 24 and 25. These bimetal compensators compensate for the ambient temperature effect on the altimeter mechanism so as to provide full altitude range compensation over a wide range of temperature. The rocking shafts 22 and 23 are supported on members 26 and 27, respectively, which are in turn connected to the ends of the mechanism frame 47 indicated by the dotted lines. Thus, member 26 is connected to the mechanism frame 47 at points 28 and 29 while member 27 is connected to the mechanism frame at the points 30 and 31.

The rocking shafts 22 and 23 are further connected to gear sectors 32 and 33, respectively, which operate on a gear associated with the shaft 34. Shaft 34 is then connected through the gear train including gears 35, 36, 37 and 38 to the instrument pointer 39 which rotates with respect to the indicating dial 40.

The shaft 34 is also connected to a drum 41 by means of the gears 42 and 43, the drum 41 serving as an indicator for the number of thousands of feet, while the rotation of pointer 39 indicates a one thousand foot change in altitude per 360° rotation.

In an assembled instrument, the drum 41 would be observable through aperture 44 in the indicating dial 40.

It is to be noted that the mechanism body or frame 47 which has the ends comprising the plate 45 and gear 46 is rotatable with respect to the mechanism shown in FIGURE 1 as being in front of the gear 46. Hence, a rotation of the frame 47 will effect a rotation of the pointer 39 which is connected to frame 47 with respect to the indicating dial 40.

That is to say, the pointer 39 which, of course, includes indicating drum 41 as an essential part thereof is rotatable with respect to the dial in two manners. The first would be a rotation due to rotation of shaft 34 because of expansion or contraction of aneroid elements 20 and 21 and the second by means of a rotation of a complete frame assembly 47.

Two barometric counters 48 and 49 are then provided where drum 48 indicates inches of mercury while drum 49 indicates millibars. Barometric counters 48 and 49 are adjustable by the adjustment knob 50 which rotates a gear 51 which in turn cooperates with the spiral gear 52. Spiral gear 52 then actuates the gear train including gears 53, 54, 55, 56, 57 and 58 where gear 55 actuates the barometric counter 48 and gear 58 actuates the barometric counter 49 and at the same time rotates frame 47 the appropriate amount through shaft 64, gear 76, differential 67, gears 66 and 65 and finally gears 62 and 46.

The above-described system can be the mechanical altimeter which is utilized in my novel invention. It is to be noted, however, that the mechanical altimeter shown in FIGURE 1 is merely illustrative of the type of mechanism which I can utilize in my novel system.

So as to allow electrical correction of the mechanical reading of the mechanical instrument described above, the shaft 34 is provided with a gear 59 which cooperates with gear 60 of Synchrotel 61.

The operation of Synchrotel 61 as will be shown more fully hereinafter operates so as to allow certain electrical corrections to proceed, such as instrument error correction.

The electrical correction factor is applied to the instrument of FIGURE 1 through the gear 46 by means of the cooperating gear 62 which is attached to a sleeve 63 connected to a gear 65. The gear 65 is, in turn, connected to a gear 66, a mechanical differential 67, and gears 68, 69, 70, 71 and a control motor 72. In like manner, the mechanical differential 67 is connected to a means 73 for automatic return of frame 47 to a non-compensated position responsive to electrical failure and will be more fully described hereinafter in connection with FIGURES 4 and 5.

During normal operation, with electrical power available to the system, the position of the pointer 39 due to the aneroid elements 20 and 21 will be modified by means of the electrical compensating system operating through the gear 62 to rotate frame 47 and its associated pointer 39 with respect to the indicating dial 40.

In the event that there is a failure of electrical power, the automatic return means 73 will automatically return the frame 47 to its non-compensated position so that the complete indicating instrument may operate as a mechanical system which is uncompensated but is nevertheless operative. Thus, a failure of electrical power will not completely destroy the instrument's value and while the electrical power system is operative, the instrument operates at higher accuracy.

It is to be noted that the servomechanism including the motor 72 and synchro 74 is connected through the wall 75 of the instrument case in a pressure tight manner so as to prevent conduction of heat to the sensitive mechanism within the frame 47. It is to be further noted that both the Synchrotel 61 and drum 41 which are geared to the pointer shaft 34 are low inertia, low friction systems, and their effect on the instrument reading when operated as a mechanical system is negligible.

As has been previously mentioned, provisions are made to adjust the barometric reading of the barometric counters 48 and 49. This adjustment is also made in the case of FIGURE 1 to effect the position of pointer 39 since a rotation of adjustment knob 50 will rotate gear 76 which in turn will rotate gears 66, 65, 62 and gear 46 of the frame 47.

It is important to note that the barometric adjustment which is desirable to adjust the altimeter or instrument to the barometric condition of the area in which the aircraft is located or will be located upon landing rotates frame 47 through the differential 67.

Hence, the barometric adjustment and the adjustment due to the electrical system may both be made at the gear 65 independently of one another. Therefore, the electrical correction system will correct the instrument reading which has already been independently corrected for local barometric conditons.

Figure 4:
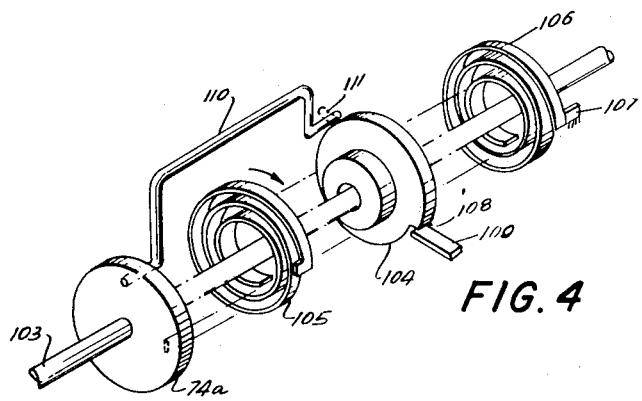
FIGURE 4 shows an exploded perspective view of my novel spring return mechanism.
Figure 5:
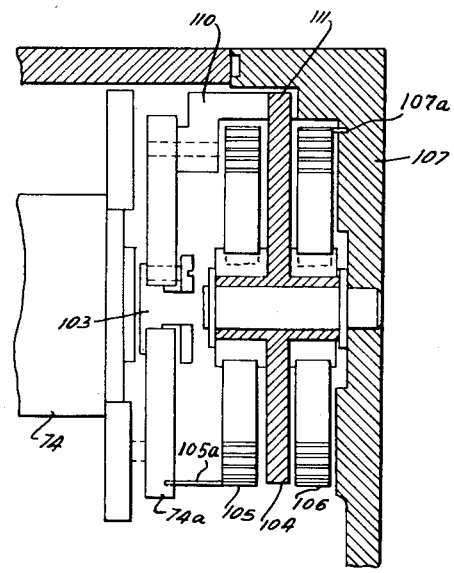
FIGURE 5 shows a side view of the assembled spring return mechanism of FIGURE 4.

The return mechanism 73 of my novel invention may be of a spring actuated type as shown in FIGURES 4 and 5 which shows the synchro 74 of FIGURE 1 and its output gear 74a attached to the rotor shaft 103. The rotor shaft 103 extends through the gear 74a and the disk 104 is concentrically mounted with respect to shaft 103 and is freely rotatable with respect thereto.

Disk 104 carries springs 105 and 106 thereon, the interior portions of the springs being fastened to the disk while the outer portion of spring 105 is anchored to the synchro gear 74a and the outer portion of the spring 106 is anchored to the housing 107 as is schematically shown in FIGURE 4. More specifically, as shown in FIGURE 5, a fastening means 107a extends from housing 107 to spring 106 while a fastening means 105a extends from spring 105 to synchro gear 74a.

As may be further seen in FIGURE 4, spring 106 is so constructed as to bias disk 104 in a clockwise direction to bring protrusion 108 into engagement with a fixed stop member 109. In a like manner, spring 105 biases gear 74a in a counterclockwise direction so that extension 110 which engages protrusion 111 of disk 104 biases disk 104 in a clockwise direction.

It is seen therefore that as gear 74a is free to rotate, it will wind up spring 105 when rotated clockwise. Disk 104 will be held against the solid stop 109 by the lip 108. It is to be noted that no action takes place with respect to spring 107. If in this position the power is interrupted, the added tension in spring 105 will cause gear 74a to return to the position in which the stop 110 on gear 74a comes into contact with the stop 111 on disk 104. At this point, a closed loop is formed and the tension of both springs no longer acts on the gear train.

In like manner, if gear 74a rotates counterclockwise, stop 110 picks up disk 104 by means of the stop pin 111 on disk 104. This rotation will cause the spring 106 to wind up such that if the power is interrupted, the spring 106 will cause the disk 104 and the gear 74a to rotate clockwise until the stop lip 108 engages the fixed stop member 109.

Figure 2:
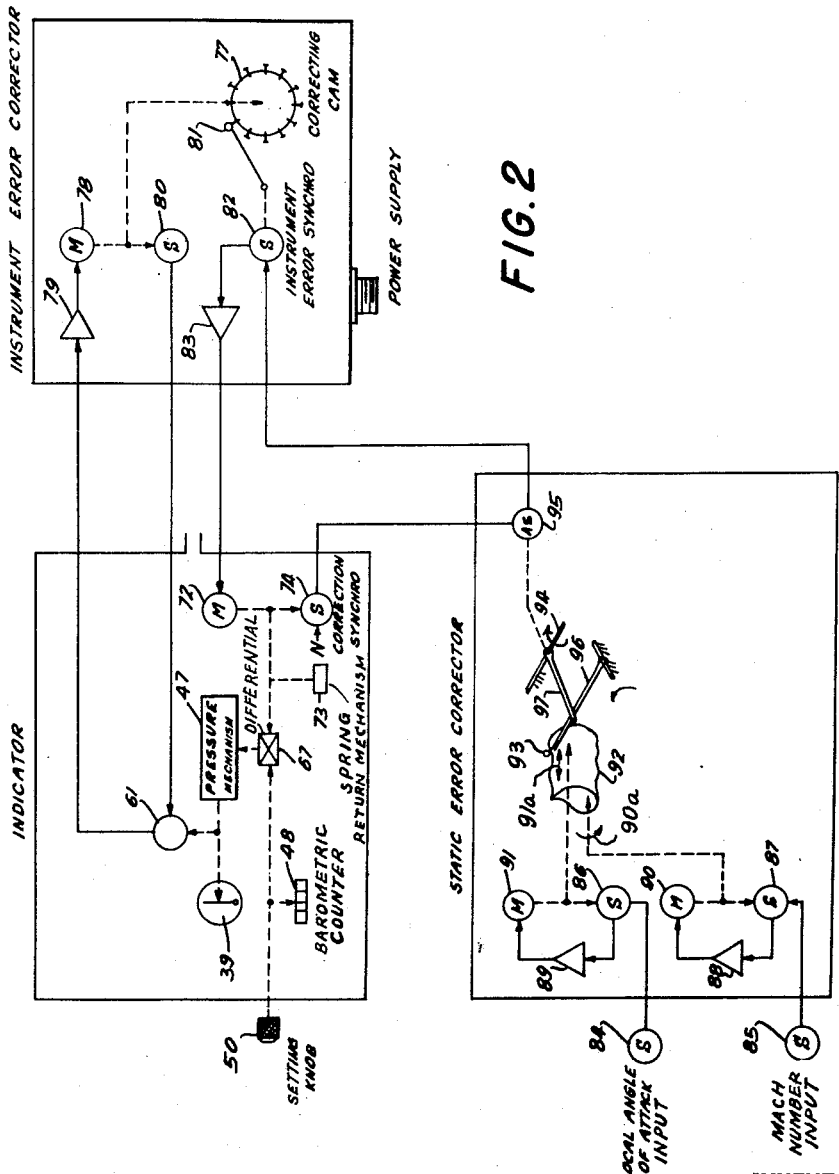
FIGURE 2 is a schematic diagram illustrating the operation of my novel system.

The operation of the system of FIGURE 1 may now be seen in conjunction with the schematic diagram of FIGURE 2 which schematically shows the electrical correcting system as being comprised of two independent components, the first of which is an instrument error corrector and the second a static error corrector.

It is first noted that either of these correction systems may be used individually or, if desired, may be used together as is shown in the figure. The block labeled "indicator" is a schematic representation of the indicating device of FIGURE 1 and similar components have been given similar numerals.

Thus, in FIGURE 2 the frame 47 has pointer 39 and Synchrotel 61 mounted thereon. The mechanical differential 67 which effects rotation of the drum 47 is shown as being operable through the adjustment knob 50 which is also connected to the barometric counter 48 and through the spring return mechanism 73 which is connected to the motor 72 and the correction synchro 74.

Since the indicating instrument 47 has certain inherent errors in view of its mechanical construction, an instrument error corrector which may be remotely positioned is provided which has a correcting cam 77 which could have a continuous cam surface or, if desired, can be provided with a plurality of adjustable cam points as is seen in the figure. The correcting cam 77 is positioned by the synchro type servo-mechanism including motor 78, Synchrotel 61, amplifying device 79 and synchro 80. Thus, the Synchrotel 61 which may be geared to rotate a little less than 360° for full range operation will position correcting cam 77 in accordance with the pointer position which is a function of the output of Synchrotel 61. This in turn positions the cam roller 81 which varies the position of the stator of the instrument error synchro 82.

In the event that the instrument error corrector is being used alone, then the instrument error synchro 82 would be connected to the correction synchro 74 of the indicator and motor 72 would be energized through the amplifier 83 to rotate the frame 47 of the indicating instrument mechanism until correction synchro 74 is rotated to a position given by the instrument error synchro 82.

In the event of a failure of electrical power which operates the various electrical components of the system, it is now understood that the spring return mechanism 73 will return the frame 47 to its uncompensated position so that the instrument reading may continue to function on a purely mechanical basis.

If it is now desired to compensate the indicator of FIGURE 2 for static error correction, since this device is exposed only to static pressure, then the static error corrector of FIGURE 2 may be connected as shown.

The static error corrector will, as has been previously set forth, correct for Mach number and for local angle of attack. The static error correcting system may be remotely connected at any convenient point in the aircraft as may the instrument error corrector and is comprised of an angle of attack synchro 84 which is connected to a sensor of angle of attack and a Mach synchro 85 which is connected to a sensor of Mach number of the aircraft. Each synchro 84 and 85 operates a system including synchros 86 and 87, respectively, amplifiers 88 and 89, respectively, and motors 90 and 91, respectively, for controlling the position of a three dimensional cam surface 92.

More specifically, the motor 91 controls the longitudinal position of the three dimensional cam surface 92 while motor 90 controls the angular position of cam surface 92 as shown by arrows 91a and 90a respectively. Hence, the coordinated positioning of cam surface 92 by motors 90 and 91 will be imparted to the cam follower 93 to position the shaft 94 of the differential synchro 95 through the multiplying lever mechanism including levers 96 and 97.

Therefore, the motor 72 will be energized until the positions of synchros 74, 82 and 95 satisfy one another so as to position frame 47 in accordance with the requirements of the instrument error corrector and the static error corrector. Here again, upon a failure of electrical power, the return mechanism 73 will position the frame 47 in the zero compensation position so as to allow continued mechanical operation of the instrument.

Figure 6:
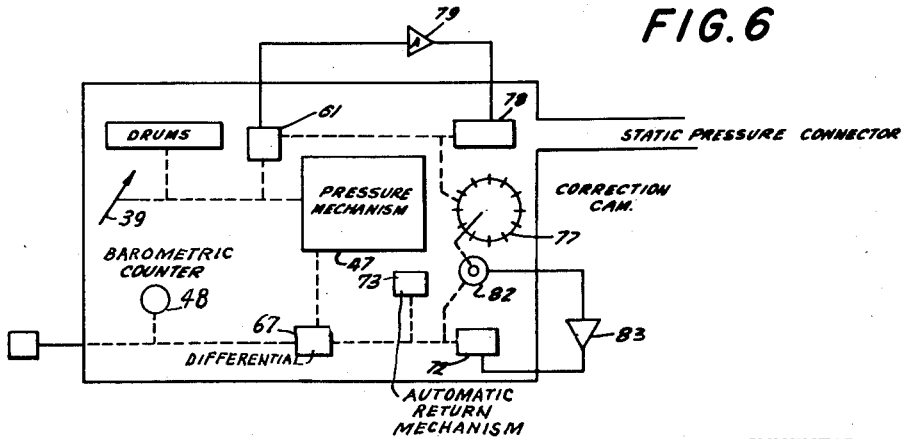
FIGURE 6 shows a modification of the embodiment of FIGURE 2.

FIGURE 6 shows a modification of the system of FIGURE 2 when only the instrument error corrector is used. In the system of FIGURE 6 it is seen that the corrector cam 77 is placed within the indicator case while the amplifiers 79 and 83 are placed in a second remotely positionable housing.

As the device is subjected to an increase in altitude, the rotor of Synchrotel 61 is rotated proportionally. The stator of Synchrotel 61 is maintained at electrical zero with the rotor of motor 78 which at the same time positions cam 77 which positions the stator of synchro 82 accordingly. Synchro 82 is also maintained at electrical zero by motor 72 which positions the rotor of synchro 82 to correspond with its stator position and at the same time positions the mechanism 47 to achieve a correction of the reading indicated by pointer 39.

Figure 3:
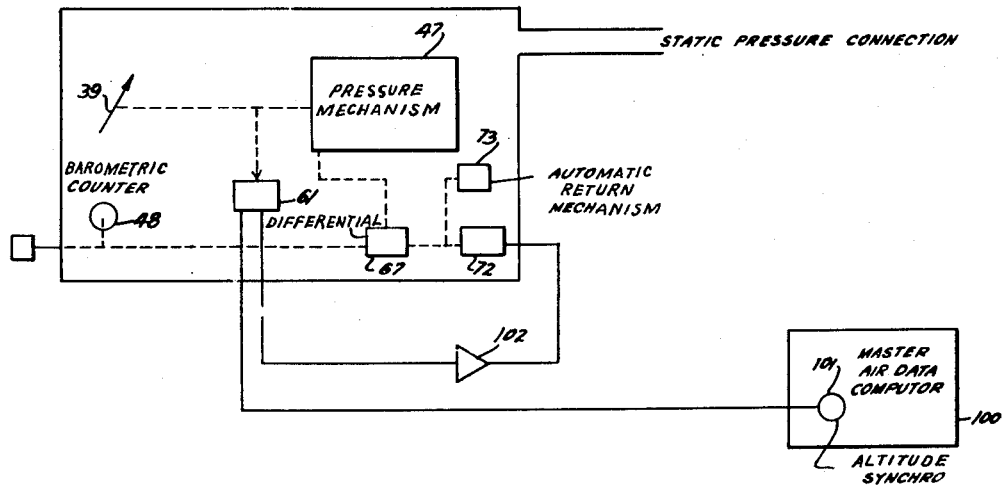
FIGURE 3 is a schematic diagram similar to FIGURE 2 and illustrates a second embodiment of my novel invention.

FIGURE 3 shows a second embodiment of my novel invention in which the electrical system functions to completely determine the pointer reading with high accuracy, while the position of Synchrotel 61 which rotates as a function of the rotation of pointer 39 feeds this information back to computer 100 so that the computer will have a basis for rotating the frame of mechanism 47.

In the event of a failure in the electrical system, a return mechanism will return the frame to a non-compensated position, and the instrument will continue to function as a purely mechanical instrument as was the case of the system of FIGURE 2.

Thus, as may be seen in FIGURE 3, the indicator is operated from a master air data computer 100 which positions a synchro 101 in accordance with its calculated value.

At any given measured value, such as altitude when the device is used as an altimeter, the rotor of Synchrotel 61 will be positioned in accordance with the mechanical reading of the altimeter mechanism 47. Any error between the Synchrotel 61 and the central air data computer synchro 101 will be amplified by amplifier 102 to cause motor 72 to rotate the mechanism 47 and its associated pointer 39 to the indicated value of the central air data computer.

If the central air data computer becomes inoperative, the return mechanism 73 will return mechanism 47 to its uncompensated position and the indicator will continue to function as a mechanical system.

When the Synchrotel 61 performs more than one full rotation for the plurality of rotations of pointer 39 over a full altitude range, the instrument within frame 47 operates to give a coarse positioning of pointer 39 within a 180° range of rotation of the Synchrotel while the air data computer provides the accurate positioning within this coarse range.

In the foregoing the invention has been described solely in connection with specific illustrative embodiments thereof. Since many variations and modifications of the invention will now be obvious to those skilled in the art, I prefer to be bound not by the specific disclosures herein contained but only by the appended claims.

I claim:

1. In an instrument system for moving an instrument indicating means with respect to a stationary means, a mechanical operating means and an electrical operating means for positioning said indicating means with respect to said stationary means in accordance with a variable measured parameter; said mechanical operating means being constructed to position said indicating means independently of said electrical operating means; said electrical operating means being constructed to compute the accurate reading to be indicated by said instrument system and to continuously position said indicating means at said accurate reading with respect to said stationary means; a spring return means; said spring return means being constructed to return said pointer to the position given by said mechanical operating means when said electrical operating means is inoperative; barometric adjusting means and a differential means; said barometric adjusting means being constructed to adjust the position of said pointer; said barometric adjusting means and said electrical operating means being constructed to position said indicating means through said differential means independently of one another.

2. In an instrument system for moving an instrument indicating means with respect to a stationary means, a mechanical operating means and an electrical operating means for positioning said indicating means with respect to said stationary means in accordance with a variable measured parameter; said mechanical operating means being constructed to position said indicating means independently of said electrical operating means; said electrical operating means being constructed to compute the accurate reading to be indicated by said instrument system and to continuously alter the position of said indicating means from the value given by said mechanical operating means to the computed value given by said electrical operating means; a return means; said return means being constructed to return said indicating means to the position given by said mechanical operating means when said electrical operating means is inoperative; barometric adjusting means and a differential means; said barometric adjusting means being constructed to adjust the position of said pointer; said barometric adjusting means and said electrical operating means being constructed to position said indicating means through said differential means independently of one another.

3. In an altimeter having a pointer movable with respect to an indicating dial; a mechanical and an electrical operating means operatively connected to said pointer for positioning said pointer with respect to said indicating dial; said mechanical operating means being constructed to position said pointer independently of said electrical operating means; said electrical operating means being constructed to correct the positioning of said pointer by said mechanical operating means; a spring return means; said spring return means being operatively connected to said pointer and constructed to return said pointer to the position given by said mechanical operating means when said electrical operating means is inoperative; barometric adjusting means and a differential means; said differential means operatively connected to said pointer; said barometric adjusting means being constructed to adjust the position of said pointer; said barometric adjusting means and said electrical operating means being connected to said differential means to position said pointer through said differential means independently of one another.

References Cited in the file of this patent

UNITED STATES PATENTS

| | | |
|---|---|---|
| 2,167,412 | Baesecke | July 25, 1939 |
| 2,419,087 | Peterson et al. | Apr. 15, 1947 |
| 2,696,597 | Chombard | Dec. 7, 1954 |
| 2,731,831 | Schaefer | Jan. 24, 1956 |

OTHER REFERENCES

Kohler et al.: abstract of application Serial Number 284, 328 published May 4, 1943—615 O.G. 71.